March 12, 1968 J. F. HYLAND 3,373,247

SEMI-CONDUCTOR JUNCTION MAGNETIC TAPE PLAYBACK HEAD

Filed April 29, 1963

INVENTOR.
JOHN F. HYLAND
BY L. Q. Miller ATTY.
Albert Sopp
AGENT

United States Patent Office 3,373,247

Patented Mar. 12, 1968

3,373,247

SEMI-CONDUCTOR JUNCTION MAGNETIC TAPE PLAYBACK HEAD

John F. Hyland, Fairfax County, Va.
(914 Timber Lane, Vienna, Va. 22180)

Filed Apr. 29, 1963, Ser. No. 276,669
11 Claims. (Cl. 179—100.2)

The invention described herein may be manufactured and used by or for the Government of the United States of America for governmental purposes without the payment of any royalties thereon or therefor.

The present invention relates to transducer heads for magnetic media and more particularly, relates to a semi-conductor junction magnetic medium playback head having a very narrow effective gap width for improved response.

It is a well known principle that in ordinary ferrous type magnetic playback heads, the smaller the gap width, the better the response, especially at high frequencies. This principle may be applied to semi-conductors as well when employed as transducers. Respones is further enhanced when the transducer head is in intimate contact with the magnetic tape at the gap. But ferrous transducer heads are typically of material of such softness that continued contact of the head with the magnetic tape causes wear and subsequent poorer response.

Accordingly, it is an object of the present invention to provide a novel transducer arrangement employing a semi-conductor junction magnetic playback head for superior playback response.

Another object of this invention is to provide a novel transducer arrangement employing a semi-conductor junction magnetic playback head characterized by a very narrow effective gap width and high resistance to wear.

These and other features and advantages of the present invention will be better understood by referring to the accompanying drawings in which.

Figure 1:
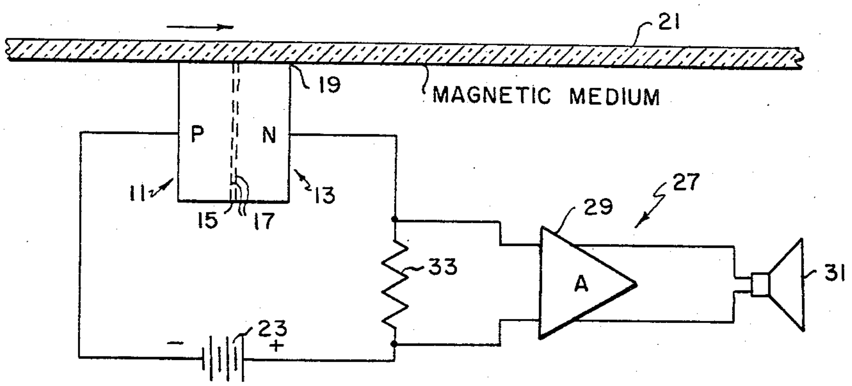
FIG. 1 is a view of a transducer device according to the invention in a circuit which applies suitable bias voltages and output means.

Referring to FIG. 1, the novel transducer device according to the invention is indicated by the numeral 11. For purposes of illustration and not by way of limitation, the transducer 11 is shown in the form of a semi-conductor junction diode 13 having the labeled P and N regions. The diode 13 is made of silicon metal or any other suitable hard semi-conductor material having high resistance to wear caused by sliding friction with magnetic or magnetized media such as steel sheets or drums, wire, or magnetic tape.

Separating the P and N regions of the diode 13 is a junction 15 indicated as being bounded by parallel planes 17 defining, for purposes of illustration only, the depletion region of the diode. The diode 13 is shown with one of its junction-containing surfaces 19 in intimate contact with a magnetic tape 21 so that the plane of the junction 15 lies transverse to the direction of arrow-indicated movement of the magnetic tape 21. The plane of the junction 15 is thus perpendicular to the plane of the tape as the tape passes the junction 15.

The semi-conductor diode 13 is biased in a reverse direction by a voltage from a battery 23 or other suitable source of bias voltage. As shown in FIG. 1 the positive terminal of the battery 23 is thus connected to the N region, and the negative terminal, to the P region of the diode.

Figure 2:
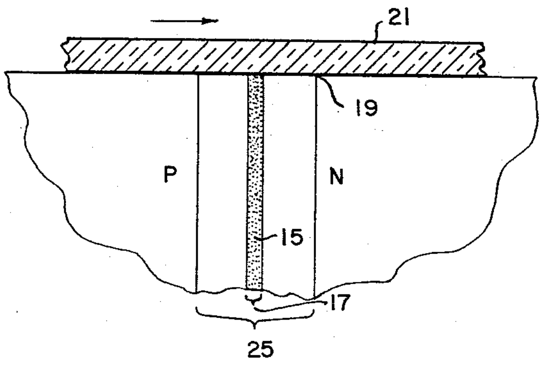
FIG. 2 is an expanded view in cross section of a portion of the transducer device of FIG. 1.

As illustrated in the expanded view of FIG. 2, the depletion region bounded by the planes 17 when the diode 13 is suitably reverse biased, although expanded from the unbiased condition, is very much less than that obtainable with conventional ferro-magnetic playback heads indicated by the region bracketed by planes 25. The fluctuating magnetic fields produced by the magnetic tape 21 act only across the junction 15 bounded by the planes 17, which is on the order of 1 micron in width, to thereby change the amount of current flow through the junction. Thus the very narrow junction 15 permits detection of much smaller (i.e. much more rapidly occurring) incremental changes in magnetic flux. Therefore, the high end frequency cut off of the transducer 11 is greatly increased. The greater the extent of incremental flux change in the junction 15, the greater is the change in output reflecting such change. Consequently, the height and length of the junction 15 is chosen depending upon the flux characteristics of the tape or magnetic medium and the reverse biasing voltage is chosen to insure operation in the linear range.

Referring again to FIG. 1, output means 27 for the transducer 11 are shown generally, for purposes of illustration only, as an amplifier 29 and a speaker 31 which may be of conventional construction. The amplifier 29 is connected across a load resistor 33 in the transducer circuit. Obviously, other output means such as an oscilliscope, a telegraphic code detector, signal analyzer, or any suitable signal handling apparatus may be employed as output means.

Figure 3:
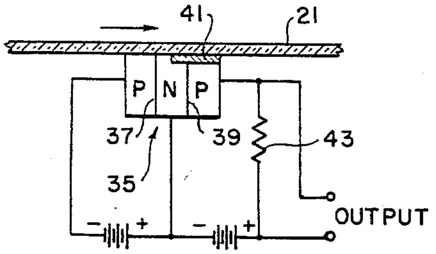
FIG. 3 is a schematic diagram of a transistor pickup circuit alternative to that illustrated in FIG. 1.

As shown in FIG. 3, there may be employed instead of a diode pickup a PNP (or NPN) transistor the reverse biased junction of which is positioned adjacent the magnetic medium. A transistor 35 has a reverse biased junction 37 and a forward biased junction 39. The reverse biased junction 37 is placed in intimate contact with the magnetic medium 21 so that the changing flux affects current conduction through the depletion region thereat The forward biased junction 39 is suitably shielded from the magnetic medium by a flux dissapating shield 41. For purposes of illustration only, and not by way of limitation, the shield is shown incorporated into the transistor body to magnetically isolate the junction 39 from the magnetic medium. The shield 41 may be of Mu-metal and suitably electrically insulated from the transistor body. Of course, shielding means external to the transistor body and located between the magnetic medium and the junction 39 may alternatively be provided.

As indicated in FIG. 3, the output taken across a load resistor 43 connected in circuit with the transistor collector and base regions bonding the forward biased junction 39. Due to amplifying action in the transistor 35, the flux induced current fluctuations at the reverse biased junction 37 will be amplified across load resistor 43. It is to be understood that other multi-region semiconductor configurations may be employed to amplify the picked-up signals.

There is thus afforded by the present invention a novel semi-conductor transducer arrangement providing very narrow effective gap width of the order of one micron or even less. By comparision conventional playback heads are generally limited to about 5 microns gap width. Further, the present novel transducer provides long wear without change in its characteristics. It is also easily manufactured and obvously does not require the high tolerances of ferrous playback heads.

Obviously many modifications and variations of the present invention are possible in the light of the above teachings. It is therefore to be understood that within the scope of the appended claims the invention may be practiced otherwise than as specifically described.

What is claimed is:

1. A playback transducer arrangement for reproducing intelligence recorded on a magnetic medium comprising:

a semi-conductor body having at least one junction, said body being oriented relative to the magnetic medium so that said junction is substantially perpendicular and transverse to the direction of relative movement of said magnetic medium, by which movement any changes in the intelligence recorded on said medium produce magnetic flux changes affecting the flow of current through said junction;

means for reverse biasing said junction to secure operation in the linear operating range; and output means connected in circuit with said semi-conductor body.

2. The transducer arrangement according to claim 1 but further characterized by said semi-conductor element being in intimate contact with the magnetic medium at a surface portion thereof including said junction.

3. The transducer arrangement according to claim 2 but further characterized by said effective gap width of the junction being of the order of about one micron.

4. The transducer arrangement according to claim 2 but further characterized by said semi-conductor element comprising a junction diode.

5. The transducer arrangement according to claim 2 but further characterized by impedance means connected in circuit with said semi-conductor element and the reverse biasing means.

6. The transducer arrangement according to claim 2 but further characterized by said semi-conductor body comprising a second forward biased junction bounded by semi-conductor regions establishing a collector and base, and output means connected across said collector and base whereby said transistor provides an amplified output for said output means corresponding to current fluctuations occurring in said reverse biased junction.

7. A semi-conductor playback transducer arrangement for reproducing information present on a magnetic medium comprising:

a semi-conductor body having at least one junction;

said semi-conductor body being oriented relative to the magnetic medium so that said junction is substantially perpendicular and transverse to the direction of relative movement of said magnetic medium, by which movement any changes in the information existing on said magnetic medium produce magnetic flux changes affecting the flow of current through said junction;

means for reducing the depletion region at said junction thereby effectively reducing the gap width of said transducer;

whereby upon connection of output means in circuit with said means and said semi-conductor body, a signal representing information existing on said magnetic medium is provided.

8. The transducer arrangement according to claim 7 but further characterized by said semi-conductor body being in intimate contact with said magnetic medium at the junction portion thereof.

9. The transducer arrangement according to claim 8 but further characterized by said semi-conductor body comprising essentially silicon metal.

10. A playback transducer arrangement for reproducing information present on a magnetic medium comprising:

a semi-conductor body constituting essentially hard semi-conductive material;

said semi-conductor body having at least one junction bounded by P and N regions;

said semi-conductor body being oriented relative to the magnetic medium whereby said junction is substantially perpendicular and transverse to the direction of relative movement of said magnetic medium, by which movement any changes in the information present in said medium produce flux changes affecting the flow of current through said junction;

a source of bias voltage connected to said P and N regions for reverse biasing said junction, whereby operation in the linear operating range is secured;

load impedance means connected between said source of bias voltage and a region of said semi-conductor body; and output means connected across said load impedance means.

11. The transducer arrangement according to claim 10 but further characterized by said semi-conductor body comprising a transistor having a least one further forwardly biased junction for providing amplification of current fluctuations occurring in said reverse biased junction.

References Cited

UNITED STATES PATENTS

| | | | |
|---|---|---|---|
| 2,916,639 | 12/1959 | Krembs | 179—100.2 |
| 2,991,366 | 7/1961 | Salzberg | 179—100.2 |

BERNARD KONICK, *Primary Examiner.*

A. BERNARD, A. I. NEUSTADT, *Assistant Examiners.*